United States Patent [19]

Hayashi

[11] Patent Number: 5,235,465
[45] Date of Patent: Aug. 10, 1993

[54] OBJECTIVE LENS SYSTEM FOR USE WITHIN MICROSCOPE

[75] Inventor: Takahisa Hayashi, Kyoto, Japan

[73] Assignee: Dainippon Screen Mfg. Co., Ltd., Japan

[21] Appl. No.: 690,632

[22] Filed: Apr. 24, 1991

[30] Foreign Application Priority Data

Apr. 24, 1990 [JP] Japan ................ 2-109850

[51] Int. Cl.$^5$ ............................................. G02B 21/02
[52] U.S. Cl. ................... 359/659; 359/656; 359/657; 359/658
[58] Field of Search ............. 359/656, 657, 658, 659, 359/660, 350, 354, 355

[56] References Cited

U.S. PATENT DOCUMENTS

| | | | |
|---|---|---|---|
| 3,711,186 | 1/1973 | O'Connor | 359/656 |
| 5,076,676 | 12/1991 | Saito | 359/656 |
| 5,144,475 | 9/1992 | Hayashi | 359/658 |

FOREIGN PATENT DOCUMENTS

| | | | |
|---|---|---|---|
| 60-70412 | 4/1985 | Japan | 359/659 |
| 1-63915 | 3/1989 | Japan | 359/660 |

*Primary Examiner*—Bruce Y. Arnold
*Assistant Examiner*—Hung Xuan Dang
*Attorney, Agent, or Firm*—Ostrolenk, Faber, Gerb & Soffen

[57] ABSTRACT

An objective lens system for use within a microscope includes a first to an eleventh lens which are disposed in that order from an object side to an image side with predetermined air spacings therebetween. The first lens in the form of a meniscus is made of quartz, and has a concave surface which is directed toward an object side. The second lens in the form of a meniscus is made of quartz, and has a convex surface which is directed toward the object side. Each of the third, fifth, sixth and eighth lenses is made of fluorite, and has a positive power. Each of the fourth, seventh and ninth lenses is made of quartz, and has a negative power. The tenth lens is made of either quartz or fluorite, and has a positive power. The eleventh lens in the form of a meniscus is made of quartz, and has a concave surface which is directed toward the image side. The system transmits ultraviolet and/or far ultraviolet light and corrects chromatic aberration.

23 Claims, 7 Drawing Sheets

SPHERICAL ABERRATION

FIG. 3B

SINE CONDITION

FIG. 3C

ASTIGMATISM

FIG. 3D

DISTORTION (%)

SPHERICAL ABERRATION

FIG.5B

SINE CONDITION

FIG.5C

ASTIGMATISM

FIG.5D

DISTORTION (%)

OBJECTIVE LENS SYSTEM FOR USE WITHIN MICROSCOPE

BACKGROUND OF THE INVENTION

1. Field of the Invention

The present invention relates to an objective lens system for use within a microscope which is employable in the ultraviolet range, in particular, in the far ultraviolet range, in which light has a wavelength of shorter than 300 nm.

2. Description of the Prior Art

It is commonly known in the art that a microscope has a property that, assuming the numerical aperture (NA) of an objective lens system used within the microscope remains constant, the shorter a wavelength of light used therein, the better its resolution limit. Thus, it is possible to observe a sample in greater detail by shortening the wavelength of illumination light. In addition, illuminating a sample with ultraviolet light may often result in fluorescence of stronger intensity discharged from a sample than fluorescence obtained by illuminating with visible light. Against this background, a microscope employable in the ultraviolet range is preferred in the art, because one obtains more information by observing a sample through such a microscope. Thus, an objective lens system for use within a microscope must be employable in the ultraviolet and/or far ultraviolet range.

Among known conventional objective lens systems which are employable in the ultraviolet and/or far ultraviolet range is, for example, an objective lens system for use within a microscope described in "Hikari Gijyutsu Contact," Volume 25, Number 2, Page 137 (Feb. 1987). This objective lens system is illustrated in FIG. 6.

Figure 6:
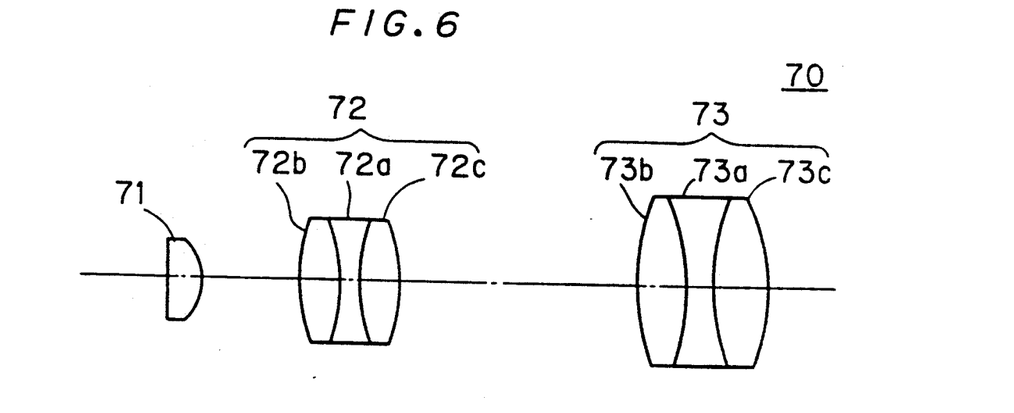
FIGS. 6 and 7 are block diagrams of known objective lens systems for use within a microscope.

In FIG. 6, an objective lens system 70 includes a first lens 71 made of fluorite, a second lens group 72 and a third lens group 73 disposed in that order from an object side (left-hand side of the figure) to an image formation side (right-hand side of the figure). The second lens group 72 includes two convex lenses 72b and 72c both made of fluorite and a concave lens 72a made of quartz. The second lens group 72 is formed by holding the concave lens 72a between the convex lenses 72b and 72c and joining the same to each other. The third lens group 73 is formed, in a similar manner to the second lens group 72, by holding a concave lens 73a made of quartz between two convex lenses 73b and 73c both made of fluorite and joining the same to each other.

Since the lenses 71, 72a to 72c and 73a to 73c are made of either quartz or fluorite, the objective lens system 70 is capable of transmitting ultraviolet and/or far ultraviolet light, and hence, employable in the ultraviolet and/or far ultraviolet range.

In addition to this, chromatic aberration can be corrected in the objective lens system 70, since the second lens group 72 is composed of the concave lens 72a made of quartz and the convex lenses 72b and 72c made of fluorite while the third lens group 73 is composed of the concave lens 73a made of quartz and the convex lenses 73b and 73c made of fluorite.

The convex lens 72b, the concave lens 72a and the convex lens 72c of the second lens group 72 are brought into optical contact and joined to each other. Similarly, in the third lens group 73, the convex lens 73b, the concave lens 73a and the convex lens 73c are brought into optical contact thereby to be joined to each other. At the current level of the art adhesive that transmits far ultraviolet light is not available yet. Further, in order completely eliminate reflection at junction surfaces between lenses, there is currently no option other than cementing by optical contact. Thus, in the process of manufacturing the objective lens system 70, the junction surfaces must be finished with extremely high accuracy, which results in high cost.

Figure 7:
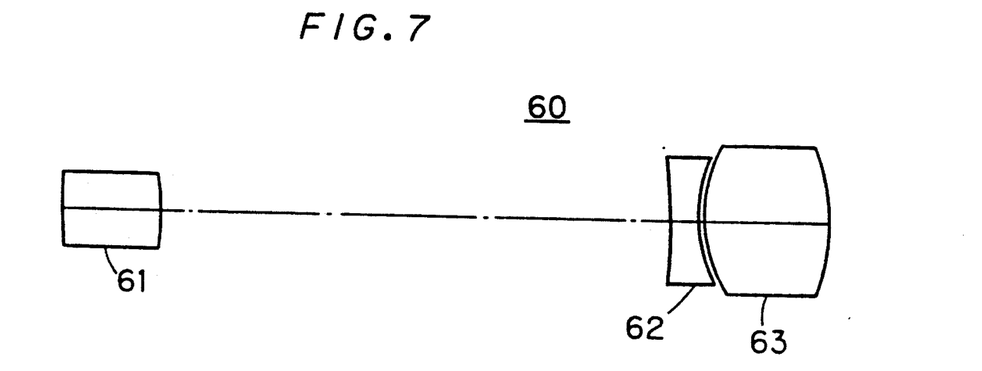

The inventor of the present invention has already suggested an objective lens system for use within a microscope in which such a problem is solved. See Japanese Patent Laid-Open Gazette Nos. 1-319719 and 1-319720. These literature references will be hereinafter referred to as the "precedent applications." FIG. 7 shows an objective lens system for use within a microscope, namely, objective lens system 60, according to an embodiment of the precedent applications. The objective lens system 60 includes lenses 61 to 63, which are made of either quartz or fluorite. The lenses 61 to 63, i.e., the first to the third lenses, are displaced in that order from an object side (left-hand side in the figure) to an image formation side (right-hand side in the figure) with preselected air spaces therebetween. This enables the objective lens system 60 to be employable in both the ultraviolet and far ultraviolet range. The lenses 61 to 63, as mentioned, are separated from each other; that is, the objective lens system 60 includes no junction surfaces. Thus, because there is no direct optical contact, the objective lens system 60 is free from the problems relating to manufacture cost of the system shown in FIG. 6.

The objective lens system 60 cooperates with an image formation lens system (detailed structure thereof will be given later) in order to form an image of an object to be observed on the focal plane of the image formation lens system at a predetermined imaging magnification M. In this case, the imaging magnification M is a ratio of the focal length $f_2$ of the image formation lens system to the focal length $f_1$ of the objective lens system 60, and is given as:

$$M = -f_2/f_1 \qquad (1)$$

In general, an objective lens system is replaced with another objective lens system to change the imaging magnification while an image formation lens system is fixed. Objective lens systems for replacement are necessary for this end, each of the lens systems having a focal length different from the focal length $f_1$.

The equation (1) indicates that an objective lens system for replacement which has a focal length of $(f_1/5)$ is necessary to observe an object at the imaging magnification of 5·M. If all that is required is to provide the other objective lens system for replacement such that its focal length becomes $(f_1/5)$, the necessary objective lens system for replacement merely has to have a size of a proportionally reduced objective lens system 60.

However, if the objective lens system 60 is replaced with the required objective lens system for replacement in which the focal length thereof is 1/5 that of the objective lens system 60, the distance between the required objective lens system for replacement and the object to be observed would have to be 1/5 that of the objective lens system 60 as long as the pupil of the microscope objective lens is fixed. This is extremely time-consuming as well as labor-consuming in that the microscope must be brought into focus once again from the beginning after the replacement, and therefore, would enormously deteriorate operation of the microscope. On the other hand, if the position of the object is fixed, the position of the pupil would have to be moved. This should also be avoided in an illumination system for illuminating the object, since positional changes of the pupil exerts unfavorable effects upon illumination conditions. In addition, such replacement causes the pupil size to be 1/5 times, which in turn causes remarkable changes in to amount of illumination light on the object.

Thus, in the case of obtaining an image of the object under a microscope at 5·M power, an objective lens system for replacement must have:

(a) a focal length being 1/5 that of the objective lens system 60;

(b) parfocality; that is, the property of eliminating the necessity of bringing a microscope into focus once again after replacement; and (c) a pupil which is roughly the same in size as that of the objective lens system 60.

SUMMARY OF THE INVENTION

The present invention relates to an objective lens system for use within a microscope. The system comprises: a first lens in the form of meniscus made of quartz, the first lens having a concave surface which is directed toward an object side; a second lens in the form of meniscus made of quartz, the second lens having a convex surface which is directed toward the object side; a third, a fifth, a sixth and an eighth lens, made of fluorite, each of which has a positive power; a fourth, a seventh and a ninth lens, made of quartz, each of which has a negative power; a tenth lens made of either quartz or fluorite, the tenth lens having a positive power; and an eleventh lens in the form of meniscus made of quartz, the eleventh lens having a concave surface which is directed toward an image side, wherein the first to eleventh lenses are disposed in that order from the object side to the image side with predetermined air spacings therebetween.

The present invention is also directed to an objective lens system for use within a microscope, which is interchangeable with other objective lens systems, the other objective lens systems forming an image at an imaging magnification M when cooperating with an image formation lens system, and which objective lens system can form an image at an imaging magnification of about 5·M when cooperating with the image formation lens system when said objective lens system is used in place of the other objective lens system.

The present invention also relates to an apparatus for measuring the thickness of a film on a sample, the apparatus including: means for illuminating a sample, and a microscopic optical system for imaging ultraviolet and-/or far ultraviolet light from the sample, the microscopic optical system including an objective lens system for converging the light in an image formation direction.

An object of the present invention is to provide an inexpensive objective lens system for use within a microscope which is employable in the ultraviolet and/or far ultraviolet range and which is different in structure from the objective lens system according to the precedent applications.

Another object of the present invention is to provide an objective lens system for use within a microscope which has (a) a focal length approximately 1/5 that of the objective lens system according to the precedent applications, (b) parfocality, and (c) a pupil roughly the same as that of the objective lens system of the precedent applications, the objective lens system according to the precedent applications forming an image on an image plane of an image formation lens system at a predetermined imaging magnification when cooperating with the image formation lens system.

Another object of the present invention is to provide an apparatus which uses ultraviolet and/or far ultraviolet light to measure accurately the thickness of a film which is formed on a sample.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Embodiment

Figure 1:
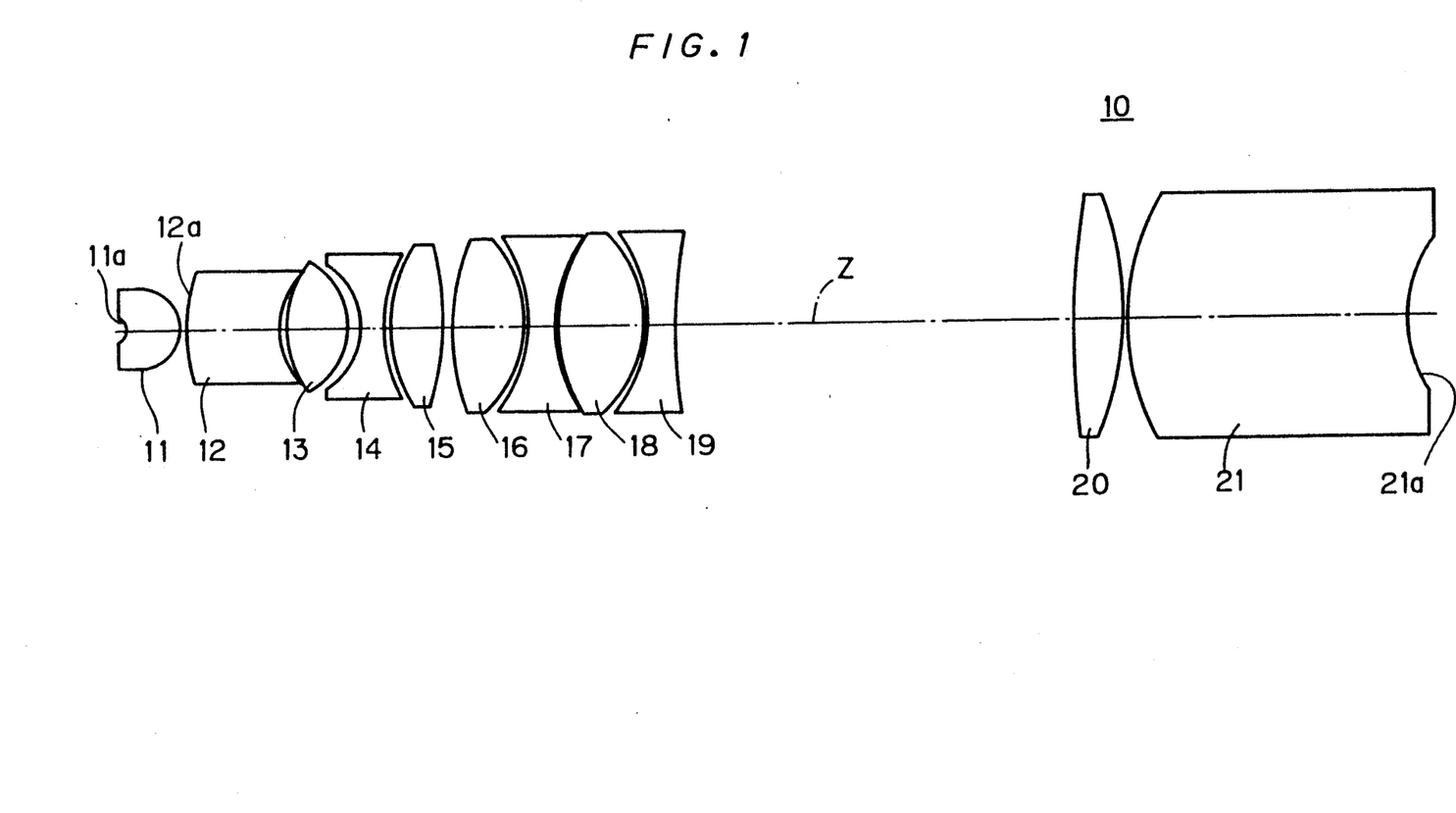
FIG. 1 is a block diagram of an objective lens system according to a first embodiment of the present invention.

FIG. 1 is a block diagram of an objective lens system according to a first embodiment of the present invention. In the figure, the objective lens system 10 comprises first to eleventh lenses 11 to 21. The first to eleventh lenses 11 to 21 are arranged from an object side (left-hand side of the figure) toward an image side (right-hand side of the figure) in this order with prescribed air spaces therebetween. The first lens 11 is a meniscus lens, and has a concave surface 11a which is directed toward the object side. The second lens 12 is also a meniscus lens, and has a convex surface 12a which is directed toward the object side. Each of the third, fifth, sixth, eighth and tenth lenses 13, 15, 16, 18 and 20 has a positive power, whereas each of the fourth, seventh and ninth lenses 14, 17 and 19 has a negative power. Further, the eleventh lens 21 is a meniscus lens, and has a concave surface 21a which is directed toward the image side.

Table 1 shows lens data of the objective lens system 10.

TABLE 1

| i | radius of curvature $r_i$ | surface-to-surface distance $d_i$ | material |
|---|---|---|---|
| 1 | −0.4995 | 1.874 | quartz |
| 2 | −1.5032 | 0.050 | |
| 3 | 5.0510 | 3.405 | quartz |
| 4 | 3.3092 | 0.081 | |
| 5 | 3.8063 | 2.160 | fluorite |
| 6 | −2.8160 | 0.442 | |
| 7 | −2.5485 | 0.900 | quartz |
| 8 | 6.2226 | 0.050 | |
| 9 | 6.6882 | 1.914 | fluorite |
| 10 | −7.5628 | 0.050 | |
| 11 | 8.7400 | 2.575 | fluorite |
| 12 | −4.7863 | 0.050 | |
| 13 | −5.0603 | 0.900 | quartz |
| 14 | 5.1468 | 0.186 | |
| 15 | 6.0915 | 3.000 | fluorite |
| 16 | −4.5562 | 0.050 | |
| 17 | −5.0839 | 0.900 | quartz |
| 18 | 97.5948 | 14.245 | |
| 19 | 1338.1910 | 1.619 | fluorite |
| 20 | −14.5270 | 0.050 | |
| 21 | 9.8859 | 10.000 | quartz |
| 22 | 4.9307 | | |

Referring to Table 1 (and Table 3 described later), $r_i$ represents a radius of curvature of an i-th (i=1 to 22) lens surface from the object side, and $d_i$ represents a distance between an i-th (i=1 to 21) lens surface and an (i+1)-th lens surface from the object side along an optical axis Z. As will be understood from Table 1, the first, second, fourth, seventh, ninth and eleventh lenses 11, 12, 14, 17, 19 and 21 are made of quartz, whereas the third, fifth, sixth, eighth and tenth lenses 13, 15, 16, 18 and 20 are made of fluorite.

The objective lens system 10 has a focal length f of 6.0, a numerical aperture (NA) of 5/12 and an image size of 10.6.

Figure 2:
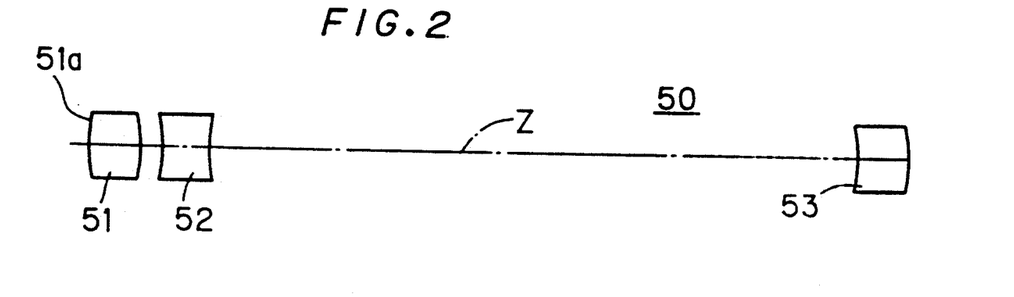
FIG. 2 is a block diagram of an image formation lens system.

The objective lens system 10 is designed as a so-called infinity corrected objective system so as to be in use within a reflecting type microscope. That is, the objective lens system 10, when used in combination with an image formation lens system, forms an image of an object on the focal plane of the image formation lens system. The image formation lens system is described in the following:

FIG. 2 is a block diagram of the image formation lens system, the image formation lens system being identical to the one disclosed in the precedent applications, namely, Japanese Patent Laid-Open Gazette Nos. 1-319719 and 1-319720. In FIG. 2, an image formation lens system 50 includes first to third lenses 51 to 53. The first, the second and the third lenses 51, 52 and 53 are displaced in that order from an object side (left-hand side of the figure) to an image formation side (right-hand side of the figure) with predetermined air spaces therebetween.

Table 2 below shows data of the image formation lens system 50.

TABLE 2

| i | radius of curvature $R_i$ | surface-to-surface distance $D_i$ | material |
|---|---|---|---|
| 1 | 23.000 | 7.00 | fluorite |
| 2 | −31.540 | 2.75 | |
| 3 | −23.180 | 7.00 | quartz |
| 4 | 33.710 | 86.40 | |
| 5 | −10.530 | 7.00 | quartz |
| 6 | −13.488 | | |

In Table 2, $R_i$ represents radius of curvature of an i-th lens surface from the object side (left-hand side in the figure), and $D_i$ represents a distance between the i-th lens surface and an (i+1)-th lens surface along an optical axis Z. As will be understood from the Table 2, the first lens 51 is made of fluorite, the second and the third lenses 52 and 53 are both made of quartz. The focal length f' of the image formation lens system 50 is 300.

Hence, the equality below gives the imaging magnification M of a microscope utilizing the image formation lens system 50 and the objective lens system 10:

$$M = -f'/f = -300/6.0 = -50.0$$

Figure 3A:
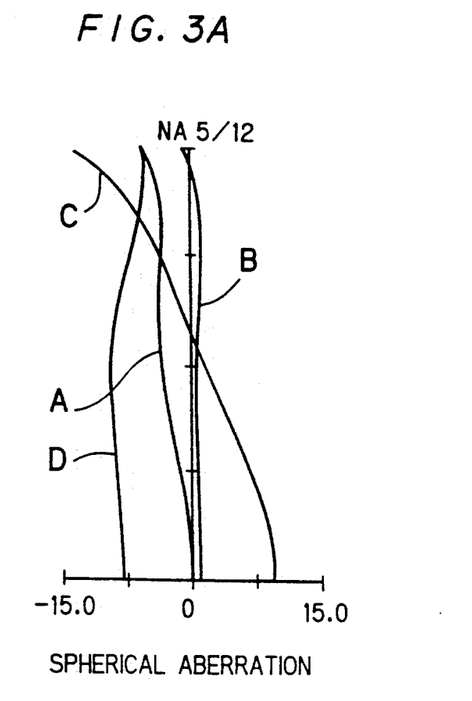
FIGS. 3A, 3B, 3C and 3D illustrate spherical aberration, sine condition, astigmatism and distortion of an optical system utilizing the image formation lens system of FIG. 2 and the objective lens system of FIG. 1, respectively.
Figure 3B:
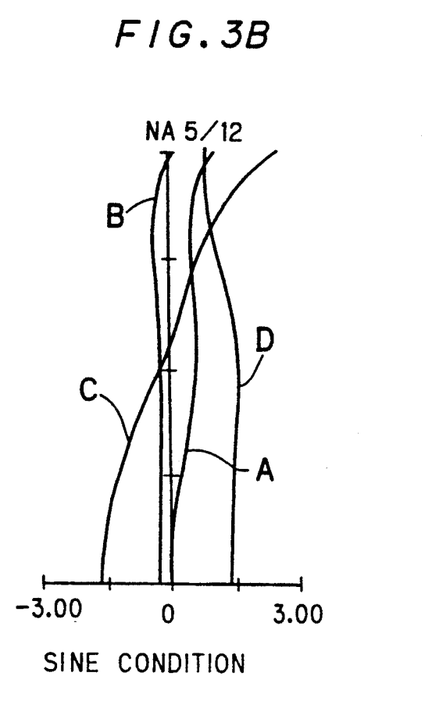

FIGS. 3A and 3B illustrate spherical aberration and sine condition, respectively, caused in the optical system formed by the image formation lens system 50 and the objective lens system 10. In FIGS. 3A and 3B (and also in FIGS. 5A and 5B: provided later), alphabetic characters A, B, C and D show a value with respect to light of wavelengths of 298.06 nm, 202.54 nm, 398.84 nm and 253.70 nm, respectively.

Figure 3C:
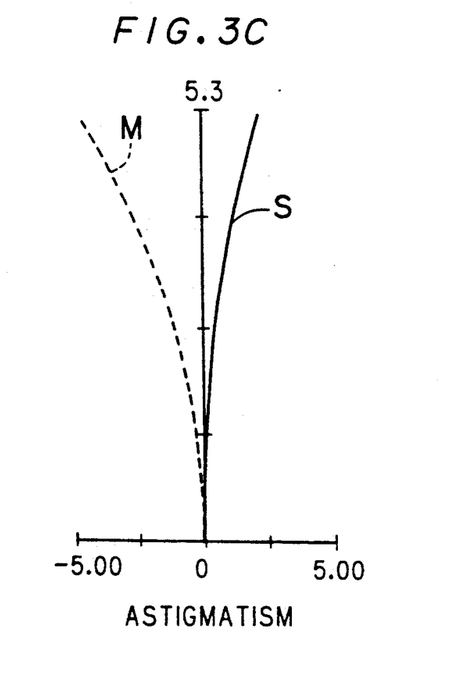
Figure 3D:
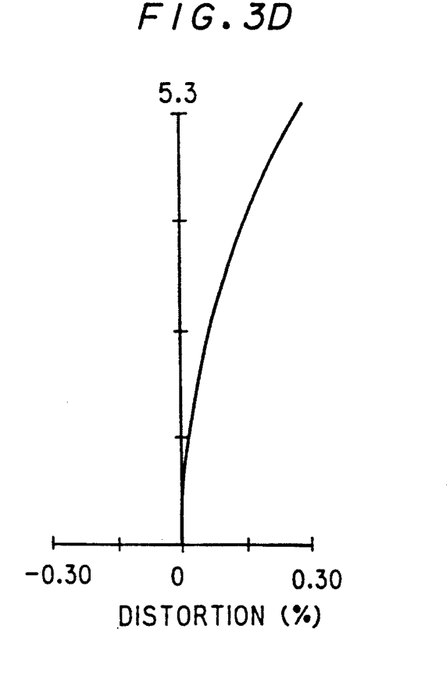

FIGS. 3C and 3D illustrate astigmatism and distortion at light of a wavelength of 298.06 nm. In FIG. 3C (and in FIGS. 5C: provided later), a solid line S relates to the sagittal image field while the broken line M to the meridional image field.

FIGS. 3A and 3B clearly show that the objective lens system 10 successfully restrains aberrations in the ultraviolet and far ultraviolet spectrum. Thus, the objective lens system 10 is employable in the ultraviolet and far ultraviolet range. In addition, FIGS. 3C and 3D show that serious astigmatism and distortion do not occur in the optical system utilizing the objective lens system 10.

B. Second Embodiment

Figure 4:
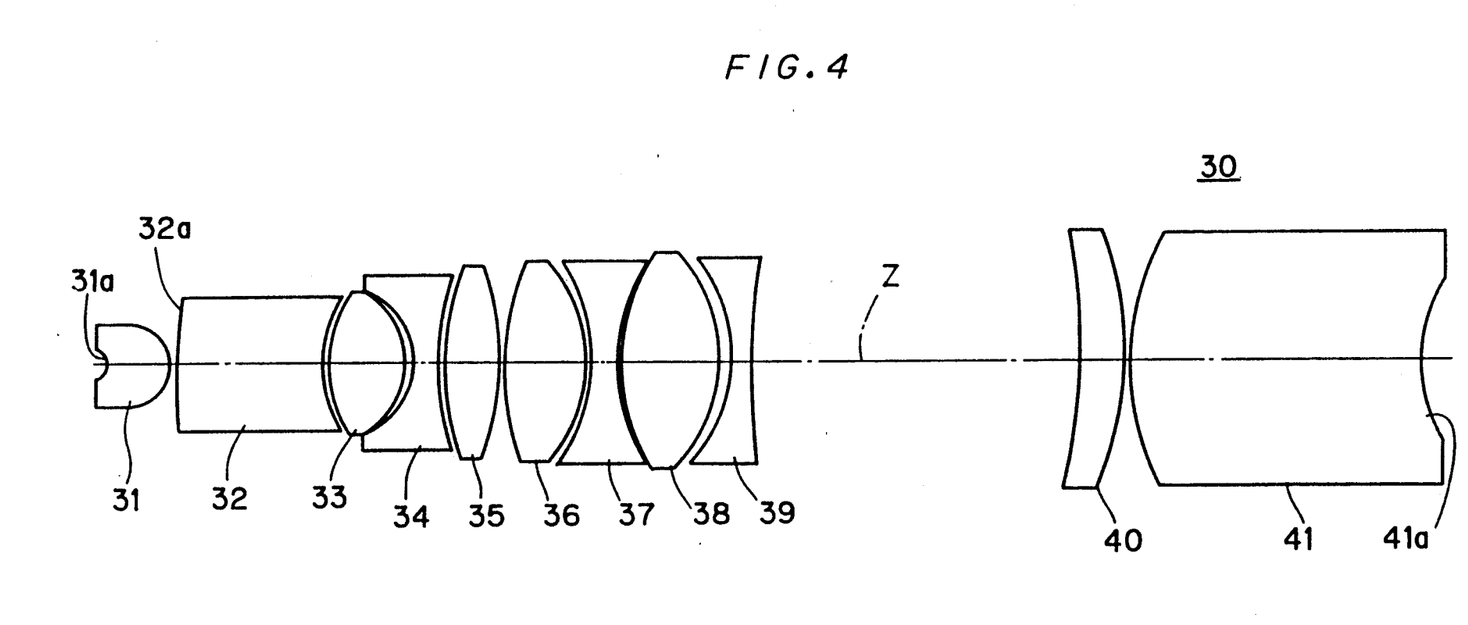
FIG. 4 is a block diagram of an objective lens system according to a second embodiment of the present invention.

FIG. 4 is a block diagram according to a second embodiment of the present invention. An objective lens system 30 according to the second embodiment is basically identical in structure to the objective lens system 10. Namely, the objective lens system 30 comprises first to eleventh lenses 31 to 41, which are arranged from an object side (left-hand side of the figure) toward an image side (right-hand side of the figure) in this order with prescribed air spaces therebetween.

Table 3 shows lens data of the objective lens system 30.

TABLE 3

| i | radius of curvature $r_i$ | surface-to-surface distance $d_i$ | material |
|---|---|---|---|
| 1 | −0.6642 | 2.150 | quartz |
| 2 | −1.5595 | 0.050 | |
| 3 | 15.9784 | 5.250 | quartz |
| 4 | 3.9558 | 0.091 | |
| 5 | 4.3454 | 2.576 | fluorite |
| 6 | −3.0536 | 0.084 | |
| 7 | −2.9185 | 0.900 | quartz |
| 8 | 8.1467 | 0.050 | |
| 9 | 8.6648 | 2.030 | fluorite |
| 10 | −9.4355 | 0.050 | |
| 11 | 10.7294 | 2.764 | fluorite |
| 12 | −5.8948 | 0.050 | |
| 13 | −6.4636 | 0.900 | quartz |
| 14 | 6.1443 | 0.210 | |
| 15 | 7.2507 | 3.286 | fluorite |
| 16 | −5.4841 | 0.414 | |
| 17 | −5.8344 | 0.900 | quartz |
| 18 | 4922.1130 | 11.113 | |
| 19 | −50.2595 | 1.591 | quartz |
| 20 | −12.1910 | 0.050 | |
| 21 | 10.0548 | 10.000 | quartz |

TABLE 3-continued

| i | radius of curvature $r_i$ | surface-to-surface distance $d_i$ | material |
|---|---|---|---|
| 22 | 4.8104 | | |

As will be understood from Table 3, the first, second, fourth, seventh, ninth, tenth and eleventh lenses 31, 32, 34, 37, 39, 40 and 41 are made of quartz, whereas the third, fifth, sixth and eighth lenses 33, 35, 36 and 38 are made of fluorite.

The objective lens system 30 has a focal length f of 6.0, a numerical aperture (NA) of 5/12 and an image size of 10.6.

The objective lens system 30 is also a so-called infinity corrected objective system similar to the objective lens system 10 of the first embodiment, and is combined with the image formation lens system 50 of FIG. 2. Therefore, imaging magnification M' of a microscope formed by the image formation lens system 50 and the objective lens system 30 according to the second embodiment are as follows:

$$M' = -f'/f = -300/6.0 = -50.0$$

Figure 5A:
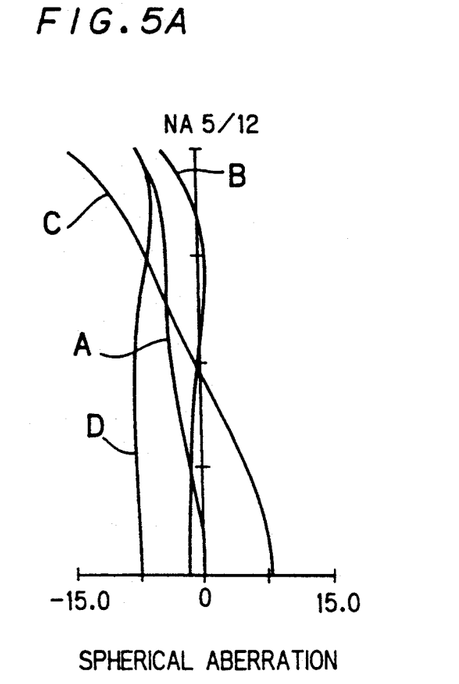
FIGS. 5A, 5B, 5C and 5D illustrate spherical aberration, sine condition, astigmatism and distortion of an optical system utilizing the image formation lens system of FIG. 2 and the objective lens system of FIG. 4, respectively.
Figure 5B:
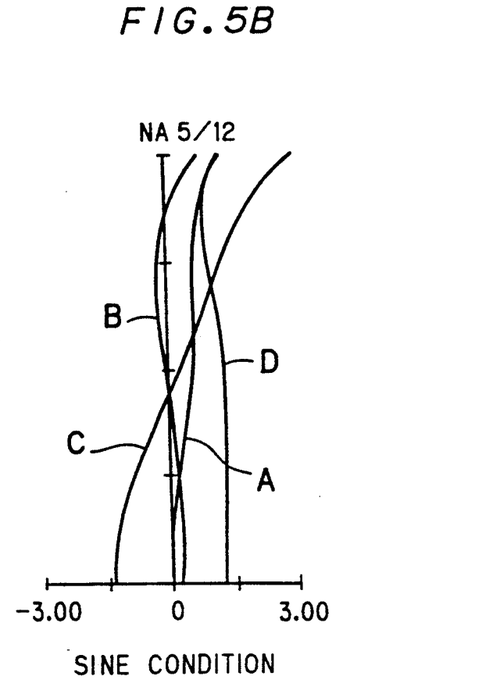
Figure 5C:
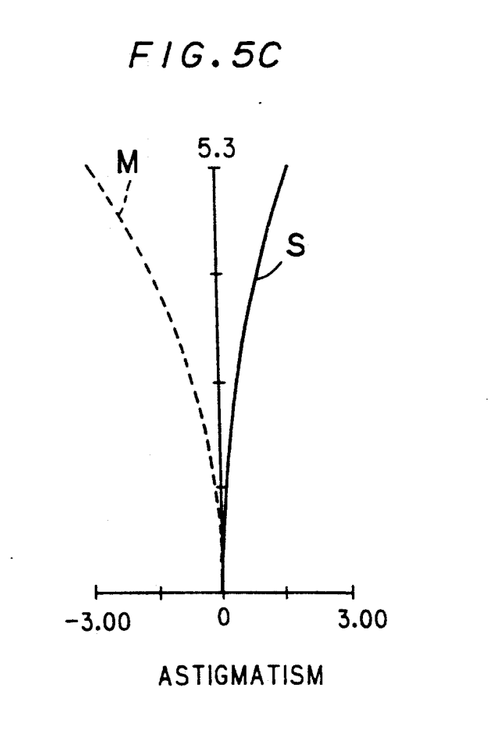
Figure 5D:
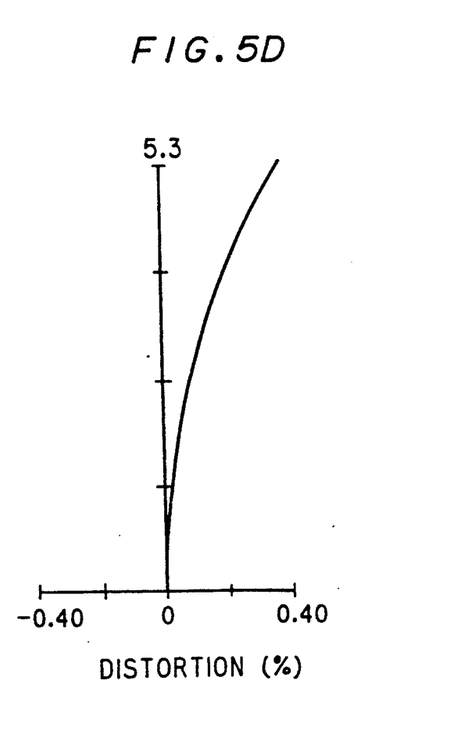

FIGS. 5A and 5B illustrate spherical aberration and sine condition of a lens system consisting of the objective lens system 30 and the image formation lens system 50, respectively. FIGS. 5C and 5D illustrate astigmatism and distortion aberration at a wavelength of 298.06 (nm), respectively.

It is understood from FIGS. 5A and 5B that aberration is small with respect to light of the ultraviolet and far ultraviolet regions according to the objective lens system 30. Thus, it is obvious that the objective lens system 30 is employable in the ultraviolet and far ultraviolet regions. It is clearly understood from FIGS. 5C and 5D that the lens system employing the objective lens system 30 has small astigmatism and low distortion.

C. Effects of First and Second Embodiments

The objective lens systems 10 and 30 according to the present invention are all employable in the ultraviolet and/or far ultraviolet range and display excellent properties in light of these ranges. Moreover, in the objective lens systems 10 and 30, the first to the eleventh lenses are separated from each other. This eliminates optical contact between the lenses, and hence will reduce cost.

Though not being especially described in the specification, it is confirmed that aberrations of visible and infrared light are also effectively restrained according to the present invention. Thus, the objective lens systems 10 and 30 are employable in a very wide range, i.e., from infrared to far ultraviolet.

Now referring again to the precedent applications, the objective lens system 60 (FIG. 7) is combined with the image formation lens system 50, to thereby obtain the imaging magnification M of −10. More precisely, the focal length of the objective lens system 60 is 30, whereas the focal length of any of the objective lens systems 10 and 30 is 6.0. Hence, the imaging magnification M can be varied from −10 to −50 by replacing, for instance, the objective lens system 60 with the objective lens system 10 while fixing the image formation lens system 50 in the same position.

Each of the objective lens systems 10 and 30 has a parfocal relation with respect to the objective lens system 60 as set forth. This eliminates the time consuming process of bringing the microscope into focus after replacement (for example, after the objective lens system 10 has replaced the objective lens system 60), whereby operation of the microscope would be greatly improved.

The objective lens systems 10 and 30 have a pupil diameter which coincides with the pupil of the objective lens system 60. In consequence, the replacement accompanies only negligible changes in quantity of illumination light onto an object, promising fairy good observation.

D. System for Measuring Film Thickness

Figure 8:
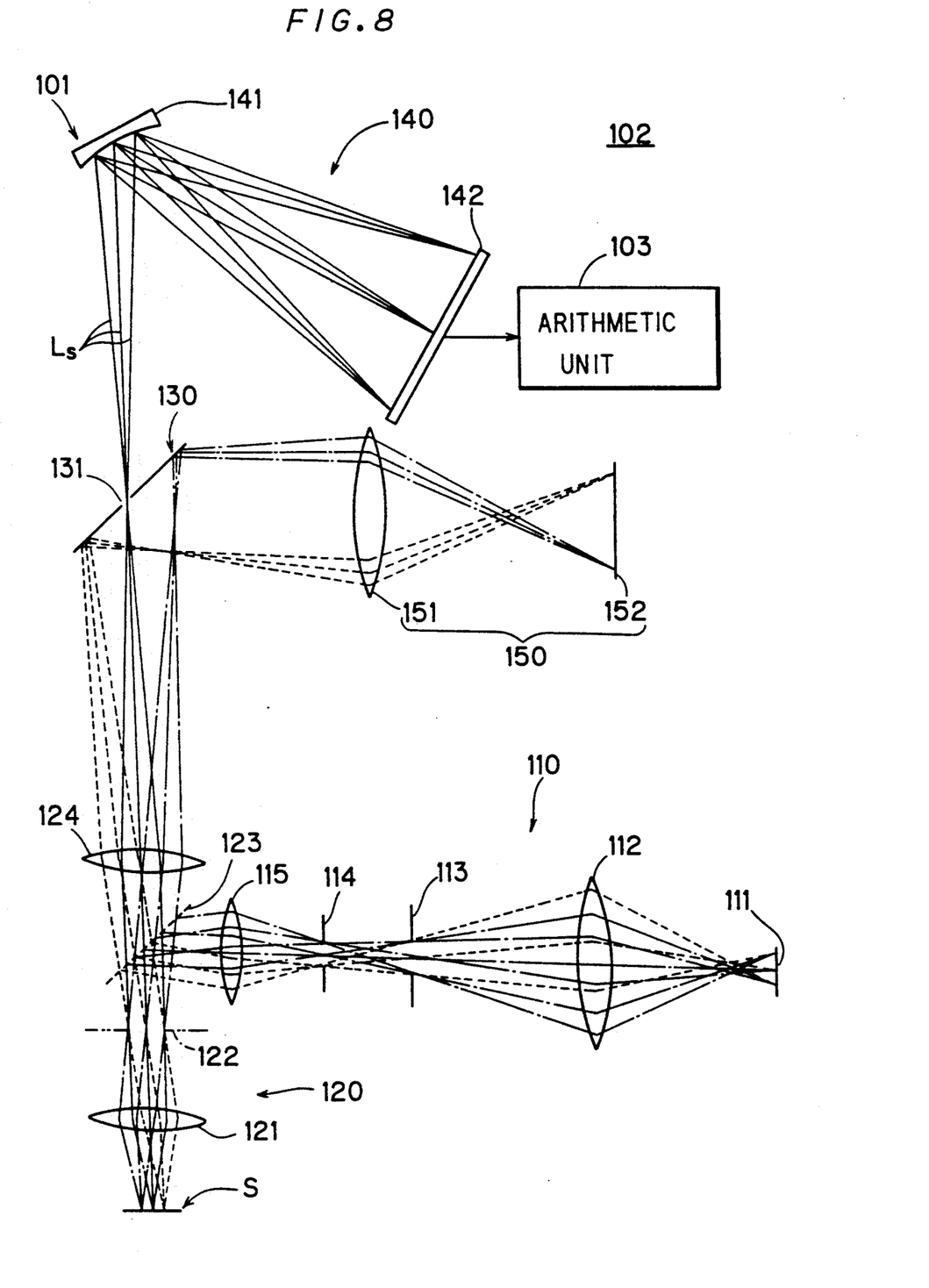
FIG. 8 is a schematic block diagram of a system for measuring film thickness.

FIG. 8 is a schematic block diagram of a system 102 for measuring film thickness. The system 102 includes a microspectroscope 101 for detecting spectrum of a sample to be measured and an arithmetic unit 103 for calculating the film thickness of the measured sample S on the basis of spectral data obtained by the microspectroscope 101. The microspectroscope 101 includes an illuminating optical system 110, a microscopic optical system 120, a reflecting mirror 130, a spectroscopic unit 140, and a monitoring optical system 150.

The illuminating optical system 110 includes a light source 111 for projecting light which includes ultraviolet and far ultraviolet rays, a condenser lens 112, an aperture stop 113, a field stop 114 and another condenser lens 115. Thus, illuminating light from the light source 111 is guided to the microscopic optical system 120 through the condenser lens 112, the aperture stop 113, the field stop 114 and the condenser lens 115.

The microscopic optical system 120 includes an objective lens system 121 which is identical to that shown in FIG. 1, an image formation lens system 124 which is identical to that shown in FIG. 2 and a beam splitter 123 provided between the objective lens 121 and the image formation lens system 124. Symbol 122 denotes a pupil position of the objective lens system 121.

The illuminating light from the light source 111 passes through the condenser lens 112, the aperture stop 113, the field stop 114 and the condenser lens 115, and is guided to the objective lens system 121 by the beam splitter 123. The illuminating light is transmitted through the objective lens system 121 and is applied onto the surface of a measured sample S. The sample S is supported by a sample holder (not shown).

Reflected light from the surface of the measured sample S is enlarged by the lenses 121 and 124, and is imaged at a position close to the reflecting mirror 130.

The reflecting mirror 130 is provided with a pinhole 131. Reflected light $L_S$ passing through the pinhole 131 enters the spectroscopic unit 140.

The spectroscopic unit 140 is formed by a diffraction grating 141 for separating the reflected light $L_S$ into spectral components and a photo detector 142 for detecting the spectrum of the spectrally diffracted light. The diffraction grating 141 may be prepared by a flat field type diffraction grating which images a spectrum on a flat plane. Alternatively, the diffraction grating may have a sweeper. The photo detector 142, which is formed by a photodiode array or a CCD, for example, is conjugate with the pinhole 131. Alternatively, the photo detector 142 may include a photomultiplier.

Since the spectroscopic unit 140 has the aforementioned structure, the reflected light $L_S$ is separated into its spectral components by the diffraction grating 141, and the respective spectral components are received by the photo detector 142, which in turn outputs a signal corresponding to the spectrum of the light $L_S$.

The light reflected by the reflecting mirror 130 enters the monitoring optical system 150, and is imaged at an image-formation position 152 through a relay lens 151. Thus, an enlarged image of the surface of the sample S is imaged on an image-formation plane, so that the measuring position of the sample S can be confirmed and focusing can be performed on the basis of the enlarged image.

Figure 9:
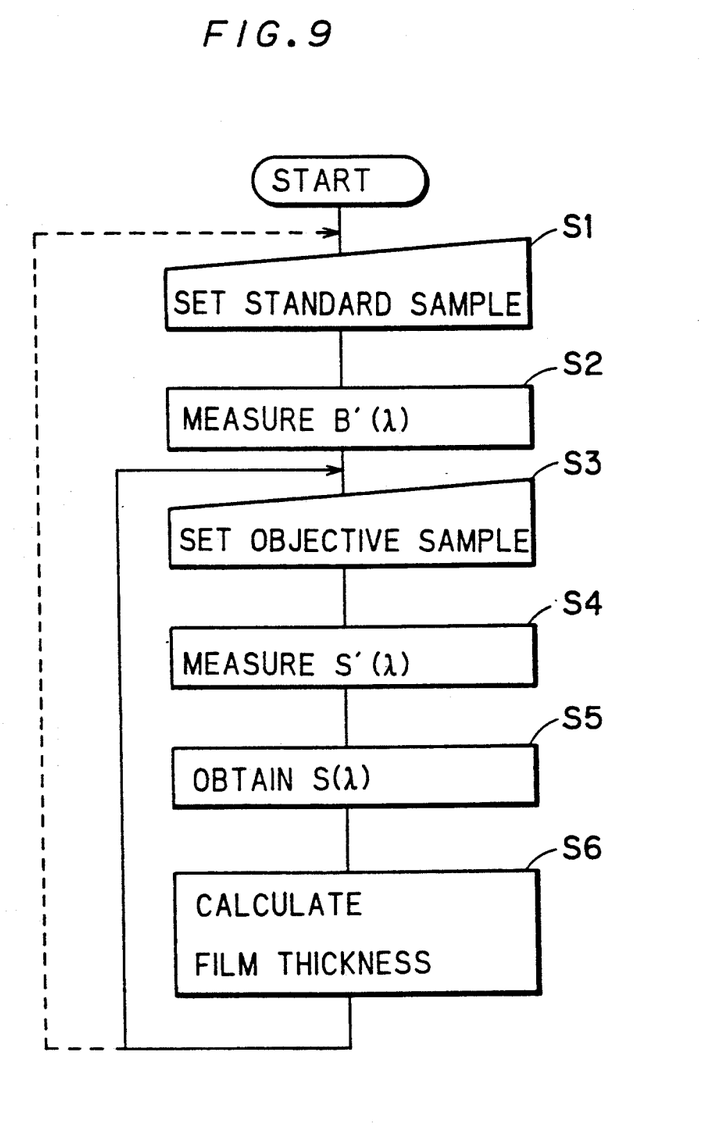
FIG. 9 is a flow chart showing a method of measuring film thickness by the system of FIG. 8.

FIG. 9 is a flow chart of a method of measuring film thickness. Prior to using the measuring system 102, an operator inputs spectrum data $B(\lambda)$ of a sample (hereinafter referred to as "standard sample"), whose spectrum data is known, in the arithmetic unit 103 through a keyboard (not shown), to store the data in a memory (not shown) provided in the arithmetic unit 103. The standard sample may be prepared by a silicon substrate, a substrate which is deposited with aluminum on its surface, or the like.

Then the operator sets the standard sample on the sample holder of the microspectroscope 101 (step S1), and supplies a command for detecting calibration data to the arithmetic unit 103. In response to a command from the arithmetic unit 103, the microspectroscope 101 detects the spectrum of the standard sample, and stores data $B'(\lambda)$ relating to the spectrum in the memory of the arithmetic unit 103 (step S2).

Then, the operator removes the standard sample from the microspectroscope 101 and sets the measured sample S on the sample holder (step S3). Thereafter, the operator supplies a command to the arithmetic unit 103 to start measurement, so that the microspectroscope 101 detects the spectrum of the measured sample S in response to a command from the arithmetic unit 103, and stores data $S'(\lambda)$ relating to the spectrum thereof in the memory of the arithmetic unit 103 (step S4).

The data $S'(\lambda)$, $B(\lambda)$ and $B'(\lambda)$ stored in the memory are read (step S5) into the arithmetic unit 103, to obtain data $S(\lambda)$ in accordance with the following expression:

$$S(\lambda) = \frac{B(\lambda)}{B'(\lambda)} \cdot S'(\lambda) \tag{2}$$

The data $S(\lambda)$ corresponds to a signal from the microspectroscope 101 on the assumption that absolutely no influence is caused by the factors such as the spectral transmittance characteristics of the illuminating optical system 110 and the microscopic optical system 120. In other words, the data $S(\lambda)$ shows the true spectrum of the measured sample S.

On the basis of the data $S(\lambda)$ obtained during step S5, the arithmetic unit 103 calculates the thickness of the thin film (step S6). The principle of calculation of film thickness is well known in the art, and hence description thereof is omitted.

As understood from the expression (2), the data $S'(\lambda)$ relating to the actually measured spectrum is calibrated in the aforementioned manner to obtain the data $S(\lambda)$ relating to the true spectrum, whereby the film thickness can be accurately measured.

The present invention can be employed in the apparatus and is not restricted to use within a system for measuring film thickness. The invention has general applications as an objective lens optical system.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An objective lens system for the ultra-violet or for ultra-violet range for use within a microscope, the lens system having an object side facing an object to be imaged and an image side facing an image produced by the lens system, the lens system comprising:

a first lens in the form of a meniscus made of quartz, said first lens having a concave surface which is directed toward the object side, a second lens in the form of a meniscus made of quartz, said second lens having a convex surface which is directed toward the object side;

a third, a fifth, a sixth and an eight lens, each made of fluorite, each of which has a positive power;

a fourth, a seventh and a ninth lens, each made of quartz, each of which has a negative power;

a tenth lens made of either quartz or fluorite, said tenth lens having a positive power; and an eleventh lens in the form of a meniscus made of quartz, said eleventh lens having a concave surface which is directed toward the image side, said first to eleventh lenses being disposed in sequential order from the object side to the image side with predetermined air spacings therebetween.

2. An objective lens system for the ultra-violet or for ultra-violet range for use within a microscope, the lens system having an object side facing an object to be imaged and an image side facing an image produced by the lens system, the objective lens system being interchangeable with another objective lens system, said other objective lens system forming an image with an imaging magnification M when cooperating with an image formation lens system, said objective lens system being adapted to form an image at an imaging magnification of approximately 5M when cooperating with said image formation lens system and when said objective lens system replaces said other objective lens system, said objective lens system comprising:

a first lens in the form of a meniscus made of quartz, said first lens having a concave surface which is directed toward the object side;

a second lens in the form of a meniscus made of quartz, said second lens having a convex surface which is directed toward the object side;

a third, a fifth, a sixth and an eighth lens, each made of fluorite, each of which has a positive power;

a fourth, a seventh and a ninth lens, each made of quartz, each of which has a negative power;

a tenth lens of either quartz or fluorite, said tenth lens having a positive power; and an eleventh lens in the form of a meniscus made of quartz, said eleventh lens having a concave surface which is directed toward the image side, said first to eleventh lenses being disposed in sequential order from the object side to the image side with predetermined air spacings therebetween.

3. An apparatus for measuring the thickness of a film sample, said apparatus comprising:

means for illuminating a sample; and a microscopic optical system for imaging at least one of ultraviolet and far ultraviolet light from said sample, said microscopic optical system including an objective lens system for the ultra-violet or for ultra-violet range for converging said light in an image formation direction, said objective lens system having an object side facing an object to be imaged and an image side facing an image produced by the lens system, the objective lens system including:
  a first lens in the form of a meniscus made of quartz, said first lens having a concave surface which is directed toward the object side; a second lens in the form of a meniscus made of quartz, said second lens having a convex surface which is directed toward the object side; a third, a fifth, a sixth and an eighth lens, each made of fluorite, each of which has a positive power; a fourth, a seventh and a ninth lens, each made of quartz, each of which has a negative power; a tenth lens made of either quartz or fluorite, said tenth lens having a positive power; and an eleventh lens having a concave surface which is directed toward the image side, said first to eleventh lenses being disposed in sequential order from the object side to the image side with predetermined air spacings therebetween.

4. A lens system for the ultraviolet or far ultraviolet range having an object side facing an object to be imaged and an image side facing an image produced by the lens system, the lens system comprising:
  a plurality of lenses in ordered sequence from the object side to the image side, the plurality of lenses including:
  a first meniscus lens having a concave surface directed toward the object side;
  a second meniscus lens having a convex surface directed toward the object side;
  a plurality of lenses following said second lens, at least one of said lenses having a positive power and at least one of said lenses having a negative power; and
  an image side meniscus lens having a concave surface directed toward the image side, said lenses being disposed from the object side to the image side with predetermined spaces therebetween, and each of said lenses comprising quartz or fluorite.

5. The lens system recited in claim 4, wherein said plurality of lenses following said second lens comprises third through tenth lenses, with said objective lens system comprising a total of eleven lenses.

6. The lens system recited in claim 5, wherein said third, fifth, sixth, eighth and tenth lenses have a positive power and said fourth, seventh and ninth lenses have a negative power.

7. An objective lens system for the ultraviolet or far ultraviolet range for use within a microscope, the lens system having an object side facing an object to be imaged and an image side facing an image to be produced by the lens system, the objective lens system being interchangeable with another objective lens system, the other objective lens system forming an image with an imaging magnification M when cooperating with an image formation lens system, said objective lens system being adapted to form an image at an imaging magnification of approximately 5M when cooperating with said image formation lens system and when said objective lens system replaces said other objective lens system, said objective lens system comprising:
  a first meniscus lens having a concave surface directed toward the object side; an second meniscus lens having a convex surface directed toward the object side; a plurality of lenses disposed following said second lens, said plurality of lenses including at least one lens having a positive power and at least one lens having a negative power;
  a further meniscus lens following said plurality of lenses having a concave surface directed toward the image side,
  said lenses in said objective lens system being disposed in ordered sequence from the object side to the image side with predetermined spaces therebetween and each of said lenses comprising quartz or fluorite.

8. The objective lens system recited in claim 7, wherein said plurality of lenses include third through tenth lenses, said objective lens system having a total of eleven lenses.

9. The objective lens system recited in claim 8, wherein said third, fifth, sixth and eighth lenses comprise fluorite, said fourth, seventh and ninth lenses comprise quartz and said tenth lens comprises quartz or fluorite.

10. The objective lens system recited in claim 8, wherein said first, second and eleventh lenses comprise quartz.

11. The objective lens system recited in claim 7, wherein said third, fifth, sixth, eighth and tenth lenses have a positive power and said fourth, seventh and ninth lenses have a negative power.

12. An apparatus for measuring the thickness of a film sample, said apparatus comprising:
  means for illuminating the sample; and
  a microscopic optical system for imaging at least one of ultraviolet and far ultraviolet light from said sample, said microscopic optical system including an objective lens system for the ultraviolet or far ultraviolet range for converging said light in an image formation direction, said objective lens system having an object side facing an object to be imaged and an image side facing an image produced by the lens system, the objective lens system including:
  a first meniscus lens having a concave surface directed toward the object side; a second meniscus lens having a convex surface directed toward the object side; a plurality of lenses following said second lens, said plurality of lenses including at least one lens having a positive power and at least one lens having a negative power; a further meniscus lens following said plurality of lenses having a concave surface directed toward the image side, the lenses in said objective lens system being disposed in sequential order from the object side to the image side with predetermined spaces therebetween, and each of said lenses comprising quartz or fluorite.

13. The objective lens system recited in claim 12, wherein said plurality of lenses include third through tenth lenses, said objective lens system having a total of eleven lenses.

14. The objective lens system recited in claim 13, wherein said third, fifth, sixth, eighth and tenth lenses have a positive power and said fourth, seventh and ninth lenses have a negative power.

15. The objective lens system recited in claim 13, wherein said third, fifth, sixth and eighth lenses comprise fluorite, said fourth, seventh and ninth lenses comprise quartz and said tenth lens comprises quartz or fluorite.

16. The objective lens system recited in claim 13, wherein said first, second and eleventh lenses comprise quartz.

17. An objective lens system for the ultraviolet or far ultraviolet range for use within a microscope, the lens system having an object side facing an object to be imaged and an image side facing an image produced by the lens system, the lens system comprising:

a plurality of lenses made of a material which transmits at least one of ultraviolet and far ultraviolet light, said plurality of lenses comprising at least one lens having a positive power and at least one lens having a negative power and at least one meniscus lens, said lenses in said objective lens system being disposed in an order from the object side to the image side with predetermined spaces therebetween and each of said lenses comprising quartz or fluorite, said plurality of lenses comprising: a group of lenses in an ordered sequence from the object side to the image side, the group of lenses including a first meniscus lens having a concave surface directed toward the object side; a second meniscus lens having a convex surface directed toward the object side;

a plurality of lenses following said second lens, and at least one of said lenses following said second lens having a positive power and at least one of said lenses following said second lens having a negative power; and an image side meniscus lens having a concave surface directed toward the image side, said lenses in said group being disposed from the object side to the image side with predetermined spaces therebetween.

18. The objective lens system recited in claim 17, wherein said plurality of lenses following said second lens comprises third through tenth lenses, with said objective lens system comprising a total of eleven lenses.

19. The objective lens system recited in claim 18, wherein said third, fifth, sixth, eight and tenth lenses have a positive power and said fourth, seventh and ninth lenses have a negative power.

20. The objective lens system recited in claim 18, wherein said third, fifth, sixth and eighth lenses comprise fluorite, said fourth, seventh and ninth lenses comprise quartz and said tenth lens comprises quartz or fluorite.

21. The objective lens system recited in claim 18, wherein said first, second and eleventh lenses comprise quartz.

22. The objective lens system recited in claim 17, wherein said objective lens system is adapted to cooperate with an image formation lens system, said objective lens system being adapted to replace a known objective lens system, said known objective lens system cooperating with said image formation lens system and having a combined magnification M, said objective lens system having a combined magnification of approximately 5M when cooperating with said image formation lens system when said objective lens system replaces said known objective lens system.

23. The objective lens system recited in claim 11, wherein said objective lens system is used within an apparatus for measuring film thickness.

* * * * *